Patented Mar. 30, 1943

2,315,328

UNITED STATES PATENT OFFICE 2,315,328

HIGH SILICA GLASS ARTICLE

Harrison P. Hood and Martin E. Nordberg, Corning, N. Y., assignors to Corning Glass Works, Corning, N. Y., a corporation of New York No Drawing. Application November 4, 1938,
Serial No. 238,896

7 Claims. (Cl. 49—92)

In our prior Patent No. 2,106,744, February 1, 1938, there is disclosed a method of making a porous, highly siliceous glass, which comprises melting a glass, fabricating the same into a fixed shape, heat treating the shaped article to separate the glass into a soluble and an insoluble phase, or in other words, to make soluble a major portion of the constituents other than silica, and leaching or dissolving out the soluble phase or constituents to leave a highly siliceous, rigid, porous structure having the same shape as the initial article. Although the patent shows that this porous article may be fired to a non-porous, transparent glass, we have now discovered that the article in the porous condition may be impregnated with various materials to form a unique composite article without the necessity of firing it.

It is therefore a primary object of this invention to produce a composite article of glass intimately compounded with dyes, pigments, resins and the like.

Another object is to clarify solutions or to adsorb and extract coloring materials from solutions to be purified.

A further object is to produce glass articles having fluorescent properties.

Still another object is to support a finely divided catalyst in a glass body in such manner that it will have a high available surface area.

The above and other objects may be accomplished by practicing our invention which embodies among its features producing a porous glass article in accordance with the method above referred to and treating the article with a solution of a material which can be adsorbed and deposited in the pores thereof.

Another feature of the invention comprises a shaped article of glass containing silica, boric oxide and alkali, the silica being over 93%, the alkali under 1% and the boric acid under 6%, the glass having pores which contain an extraneous material other than air and water.

In practicing our invention, the article is fabricated in the usual manner from a glass containing 60% to 82% $SiO_2$, 20% to 35% $B_2O_3$ and 5% to 10% alkali oxide, the composition being governed by considerations set forth in the above mentioned patent. In these glasses alumina may be present in small amounts and its presence in amounts up to 4% in glasses of low silica content located near the center of the defined field is advantageous in facilitating the subsequent leaching of the glass.

The article is subjected to a heat treatment which comprises heating the glass at a temperature between about 525° and 600° C. for a time necessary to cause the required change in structure. As a result of the heat treatment, the glass will become more or less completely separated or formed into two phases one of which is very rich in boric oxide and alkali and is soluble in acids and the other of which is very rich in silica and is substantially insoluble in acids. In other words, a change has taken place in the structure of the glass so that the constituents other than silica are for the most part soluble in acids and may be extracted thereby.

The previous thermal history of a glass has a bearing upon the heat treatment which may be required for best results. Articles which are relatively thick receive some heat treatment in normal working and cooling and the additional heat treatment required may be different from that required by a thinner article which was cooled more quickly during manufacture. Hence the term "heat treatment" as used herein includes heat treatment during fabrication as well as any additional heat treatment following fabrication.

In order that the leaching step may be carried out with better facility, it is desirable to etch off the surface of the glass by immersing it for a few minutes in a dilute solution of hydrofluoric acid or in a hot 5% solution of sodium hydroxide.

The article is then rinsed and immersed in dilute hydrochloric, nitric, or sulfuric acid, the temperature of the bath being held preferably at or near its boiling point to obtain maximum speed of extraction. The progress of the extraction may be observed because the interface between the extracted and unextracted portions of the glass is visible. Instead of carrying the extraction to completion, it may be stopped when any desirable depth has been reached by removing the article from the acid bath.

After the acid treatment, the glass is washed to remove all traces of the soluble constituents which have been acted on by the acid. This is best accomplished by immersing the glass for several hours in pure running water so as to expose all sides of the article to the washing action. The removal of the soluble phase leaves the silica phase as a rigid structure possessing the original shape of the article, but submicroscopically porous, the pores being filled with water. The article may thereafter be dried and in general will be substantially transparent, probably because the individual pores are too small to reflect light. Articles thus produced in which the pore size is sufficiently large will have light diffusing characteristics. As noted above, the process may be conducted for a time sufficient to leach a surface layer of any desired thickness, thereby producing an article having a highly siliceous porous layer on its surface and integral therewith. For the purpose of the present invention, a porous surface layer so formed should be at least one-tenth of a millimeter thick, because with depths less than this there is insufficient pore space in the layer for the proper operation of the process.

We have discovered that various organic and inorganic dyes and pigments and/or resins can be introduced and impregnated into the pores of such an article, thereby providing a means for coloring glass in a wide variety of colors which have heretofore been unattainable by the usual glass making methods and producing glass articles which are useful as light filters, objects of art, etc.

We have further discovered that porous glass prepared by the above described method has selective absorptive properties and may be used to remove various impurities from liquids. The aforesaid porous glass can also be used as a support for catalysts by impregnating it with, and depositing in the pores thereof, a catalyst, as will later appear.

For impregnating, the materials must initially at least be in liquid form and hence are preferably dissolved into a solvent from which they can be adsorbed and deposited in the pores or which can be deposited along with the materials. The impregnated article will possess the same quality of transparency or translucency as the initial unimpregnated porous article if the solvent is largely or entirely evaporated from the pores. Light diffusing characteristics can be produced by impregnating or filling the pores with a resin or viscous high boiling liquid which has a substantially different refractive index than the glass or which will crystallize within the pores. On the other hand, entirely filling the pores with materials having a refractive index near that of the glass will produce transparent articles. The following examples will illustrate various embodiments of the invention.

Dried porous glass articles prepared by the above described method were immersed for 10-20 minutes in warm water solutions of the following dyes: acridine orange 3RN, anthraquinone violet R, Victoria blue BX, Victoria green small crystals, crystal violet 6B. After such treatment the glass was strongly colored and the dye could not be washed out by subsequent washing in hot water. With basic dyes in particular, the glass exerted an adsorptive action that extracted considerable of the dye from the supernatant liquid. After being dried, the colored articles were still porous and were as transparent as they had been before the treatment. Practically any dye can be used and various solvents can be employed. Dyes which are only sparingly soluble in water may readily be dissolved in higher concentration by adding to the solution a small amount of a suitable water miscible solvent such as dioxane. Instead of treating the glass with a single dye solution, it can be treated with two or more solutions which will react to form a dye within the glass.

Since colored articles thus made still possess substantial porosity, it is desirable to seal the pores in order to prevent subsequent further adsorption and contamination thereof. This may easily be done by treating the article with a high boiling liquid such as monoethyl ether of diethylene glycol (known as carbitol), or glycol or glycerine, etc., which will be retained in the pores and completely fill them. The article is preferably heated in the liquid to expel all water that may be in the pores and it may be thus treated after dyeing as above, or may be dyed and treated in one operation. As an example, articles of the above described porous glass were dyed by immersing them in a 1% solution of a dye known as pontacyl ruby G dissolved in carbitol and heating the solution at 140°–150° C. for a few minutes. The articles when finished were transparent and the resulting red color could not be removed by boiling in fresh carbitol, in water, in hydrochloric acid, or in a solution of weak alkali.

Glass plates dyed in this manner with dyes having desired spectral absorptions may advantageously be substituted for the cumbersome water cells heretofore used for light filtering purposes. If desired, an article, which has been dyed or treated with organic materials, may be decolorized or re-dyed. This may be done by heating it slowly to a temperature of several hundred degrees and preferably in an atmosphere of oxygen. The organic material is thereupon burned out, leaving the porous glass unchanged.

Inorganic dyes or pigments can also be introduced into the pores of a glass article which has first been rendered porous, as above described. In this case the porous glass is first impregnated with a salt of a metal, which will form a colored precipitate, by immersing it in a solution thereof. The article is then rinsed and transferred to a solution of another salt which will form the desired precipitate, whereupon precipitation takes place in the pores.

For example, a porous glass article was heated for a half hour at about 140° C. in a solution of ferric chloride in glycol. After rinsing with water it was dipped in a solution of potassium ferrocyanide, whereupon Prussian blue was formed in the pores.

Again a porous glass article was heated in a solution of lead acetate, dissolved in glycol. When subsequently immersed in a solution of potassium dichromate a precipitate of lead chromate was formed in the pores and the glass was colored a transparent yellow.

Various organic plastics or resins can be used to fill the pores of the porous glass. This embodiment of the invention in its simplest form comprises treating the porous glass article with a solution of the desired resin in a suitable solvent to fill the pores therewith and thereafter evaporating the solvent from the pores. In this manner polyvinyl acetate dissolved in its monomer was introduced into the pores of a dried porous glass article and the solvent evaporated to leave the resin in the glass.

Some organic plastics can be introduced into the pores as the monomer and thereafter polymerized to fill the pores with the solidified plastic. As an example, a dried porous glass plate was impregnated by immersion in monomeric methyl methacrylate containing a small amount of benzoyl peroxide as a catalyst. The impregnated plate was then heated for eight hours at 70° C. in a sealed tube containing a small amount of the monomer. The methyl methacrylate within the pores was polymerized to a solid resin and the composite plate was transparent.

In the same manner styrene was introduced into dried porous glass and polymerized.

If desired, the composite articles may be colored by first dyeing the porous glass as described above or by dissolving the dye in the plastic before the latter is introduced into the pores.

Some materials when introduced into the porous glass produce a composite article having opal or diffusing effects when the article is at or below a definite temperature, but being transparent when the article is heated above this temperature. A porous glass article containing in its pores incompletely polymerized styrene is clear and transparent at temperatures above 70° C., but becomes opal when cooled down to room temperature. Articles the pores of which contain beeswax or paraffin show a similar effect. The reason for this is not entirely understood.

In coloring and/or decorating porous glass articles it will be obvious that the process is not limited to treatments in which the entire body of the glass, that is, the total available pore space, is impregnated and it will be apparent that selected areas of the glass or sections of the pore space may be individually impregnated with a single color or a plurality of colors to form a design within the glass. This can readily be accomplished by applying the impregnating materials with a brush or a stamp or by means of the well known silk screen process. For this purpose the viscosity of the solutions may be increased or diminished by the addition of miscible liquids of different viscosities, such as glycerine, glycol, alcohol, etc. After such selective impregnation the unfilled pores may be filled or sealed, if desired, by treating the entire article with a plastic or highly viscous liquid as described above, thus insuring permanency of the design.

As a further embodiment of the invention, articles of the aforesaid porous glass in any suitable shape, such as small spheres or small hollow cylinders, may be impregnated with various catalysts and used for the promotion of chemical reactions. Due to the countless number of extremely minute, intercommunicating pores in which the catalyst is deposited, it is in a very fine state of subdivision and hence is very active. As an example, small pieces of the porous glass were impregnated with ammonium chloroplatinate by immersing them in a solution thereof and thereafter rinsing, drying and igniting the impregnated glass to decompose the salt and deposit finely divided metallic platinum in the pores. The porous glass pieces thus impregnated were placed in a combustion tube heated to a temperature of 475°–500° C. and a gaseous mixture comprising about 8% sulphur dioxide and 92% air by volume was passed slowly through the tube. Analysis of the effluent gas gave the ratio $$\frac{SO_3}{SO_2} = \frac{2.20}{1}$$

showing that the impregnated glass had caused substantial oxidation of the sulphur dioxide.

By means of the invention fluorescent screens of glass containing any soluble or liquid fluorescing agent can be produced by depositing the fluorescing agent within the pores of the glass. A tube composed of the porous glass was impregnated by immersing it in a solution of rhodamine and thereafter rinsing and drying it. The resulting article was intensely fluorescent when exposed to ultraviolet light. In like manner various other fluorescent materials may be incorporated into the porous glass and a variety of articles having the property of fluorescence may thus be produced. Also, if desired, the pores of the glass after such impregnation with fluorescent materials may be filled or sealed with a resin or a highly viscous liquid as described above.

We claim:

1. As a new article of manufacture a composite article comprising a uniform skeleton structure of glass having a multiplicity of interconnecting submicroscopic pores extending throughout the mass and communicating with the outer surfaces of the article, and a material other than glass deposited throughout the pores of at least a portion of the skeleton and imparting to that portion different physical characteristics than those possessed by the glass skeleton.

2. As a new article of manufacture a composite article of generally uniform character throughout comprising a skeleton structure of glass having a multiplicity of interconnecting submicroscopic pores extending throughout its mass and communicating with the outer surfaces of the article, and a material other than glass deposited throughout the pores and imparting to the article as a whole different physical characteristics than those possessed by the glass skeleton.

3. As a new article of manufacture a composite article comprising a uniform skeleton structure of glass having a multiplicity of interconnecting submicroscopic pores extending throughout its mass and communicating with the outer surfaces of the article, and a material other than glass deposited throughout the pores of at least a portion of the glass skeleton, the glass being substantially colorless and the deposited material imparting a color to the portion.

4. As a new article of manufacture a composite article of generally uniform character throughout comprising a skeleton structure of glass having a multiplicity of interconnecting submicroscopic pores extending throughout its mass and communicating with the outer surfaces of the article, and a dye deposited throughout the pores, the glass being substantially colorless and the article as a whole appearing colored and substantially transparent.

5. As a new article of manufacture a composite article of generally uniform character throughout comprising a skeleton structure of glass having a multiplicity of interconnecting submicroscopic pores extending throughout its mass and communicating with the outer surfaces of the article, and a material other than glass deposited throughout the pores and imparting to the article as a whole different physical characteristics than those possessed by the glass skeleton, the article as a whole being substantially transparent.

6. As a new article of manufacture a composite article comprising a uniform skeleton structure of glass having a multiplicity of interconnecting submicroscopic pores extending throughout the mass and communicating with the outer surfaces of the article, and a fluorescent material other than glass deposited throughout the pores of at least a portion of the skeleton.

7. As a new article of manufacture a composite article comprising a uniform skeleton structure of glass having a multiplicity of interconnecting submicroscopic pores extending throughout the mass and communicating with the outer surfaces of the article, and an organic plastic material deposited throughout the pores of at least a portion of the skeleton.

HARRISON P. HOOD.
MARTIN E. NORDBERG.